United States Patent [19]

Smilgys et al.

[11] 4,239,096
[45] Dec. 16, 1980

[54] POWER TOOL SAFETY CLUTCH

[76] Inventors: Bruno S. Smilgys; David B. Smilgys, both of 42 Fairfield Ave., Hartford, Conn. 06114

[21] Appl. No.: 949,898

[22] Filed: Oct. 10, 1978

[51] Int. Cl.³ .......................................... F16D 43/20
[52] U.S. Cl. ........................ 192/103 C; 192/56 C; 192/89 W; 192/26
[58] Field of Search .............. 192/415, 56 C, 103 C, 192/35, 37, 99 B, 89 W, 150, 0.077, 26, 81 C

[56] References Cited

U.S. PATENT DOCUMENTS

| 2,513,798 | 7/1950 | Hatfield | 192/103 C |
|---|---|---|---|
| 2,829,748 | 4/1958 | Sacchini et al. | 192/103 C |
| 2,994,418 | 8/1961 | Floyd et al. | 192/35 |
| 3,521,730 | 7/1970 | Weatherby | 192/26 |

Primary Examiner—Kenneth Downey
Attorney, Agent, or Firm—Walter C. Vliet

[57] ABSTRACT

A devise for sensing sudden abnormal movement of a power operated tool, such as a hand held circular saw or drill. The device, comprising a wrap spring clutch and an inertia sensing means, further rapidly declutches the tool drive in response to the abnormal movement. The declutching reduces the severity of movement where it is power induced and renders the output drive inoperative to improve operator safety. The tool must be positively reset to accomplish further operation.

10 Claims, 7 Drawing Figures

POWER TOOL SAFETY CLUTCH

BACKGROUND OF THE INVENTION

The problem of circular saw kick back induced by a saw blade binding in the saw kerf is well known. In modern high speed and high power low weight hand-held circular saws, the resulting kick back can be extremely violent, and it is not uncommon for the operator to lose control of the saw and be injured.

Numerous attempts to minimize the problem have been made. For example, friction clutches have been utilized in the ouput spindle or gear drive. Friction clutches have the disadvantage of requiring constant adjustment, and to be effective must limit to power output of the saw. In heavy cutting, they are prone to slipping and overheating.

Another approach is to utilize a "dead man" type brake which is applied when the operator loses his grip on the saw. This type of mechanism to be effective must be fast operating, and the entire inertia of the drive as well as the output power of the tool must be absorbed by the brake. This approach in many cases resulted in cumbersome mechanisms which detract from operator grip and control of the device and the severe braking required to be effective is damaging to the power drive of the tool.

SUMMARY OF THE INVENTION

The present invention utilizes a wrap spring clutch in the output drive of the power tool which releases the power source from the output drive in response to a selected abnormal movement of the tool. A pivoted mass surrounding the wrap spring operates in response to the abnormal movement to release the wrap spring.

The object of the present invention is to provide a safety device for declutching the work output means of a power tool from the power drive in response to a preselected rapid movement of the tool.

A specific object of the present invention is to release the output spindle of a hand circular saw or a power drill form the drive means in response to a binding condition in the output spindle which could damage the power tool or react suddenly and excessively on the operator to thereby cause loss of control and possibly injury to the operator.

An object of the present invention is to provide a safety device comprising: A motor driven spindle interconnecting a motor means and a work output means; a wrap spring clutch interconnecting the spindle with the work output means for transmitting power therebetween; an inertia means operatively associated with the wrap spring clutch for effecting declutching of the wrap spring clutch in response to a selected movement of the power tool.

These and other objects will be further understood by referring to the following description of the preferred embodiment of the invention.

DESCRIPTION OF THE PREFERRED EMBODIMENT

The invention is described in the following preferred embodiment for purposes of understanding the invention. It should be understood that the embodiment described is for that purpose.

Figure 1:
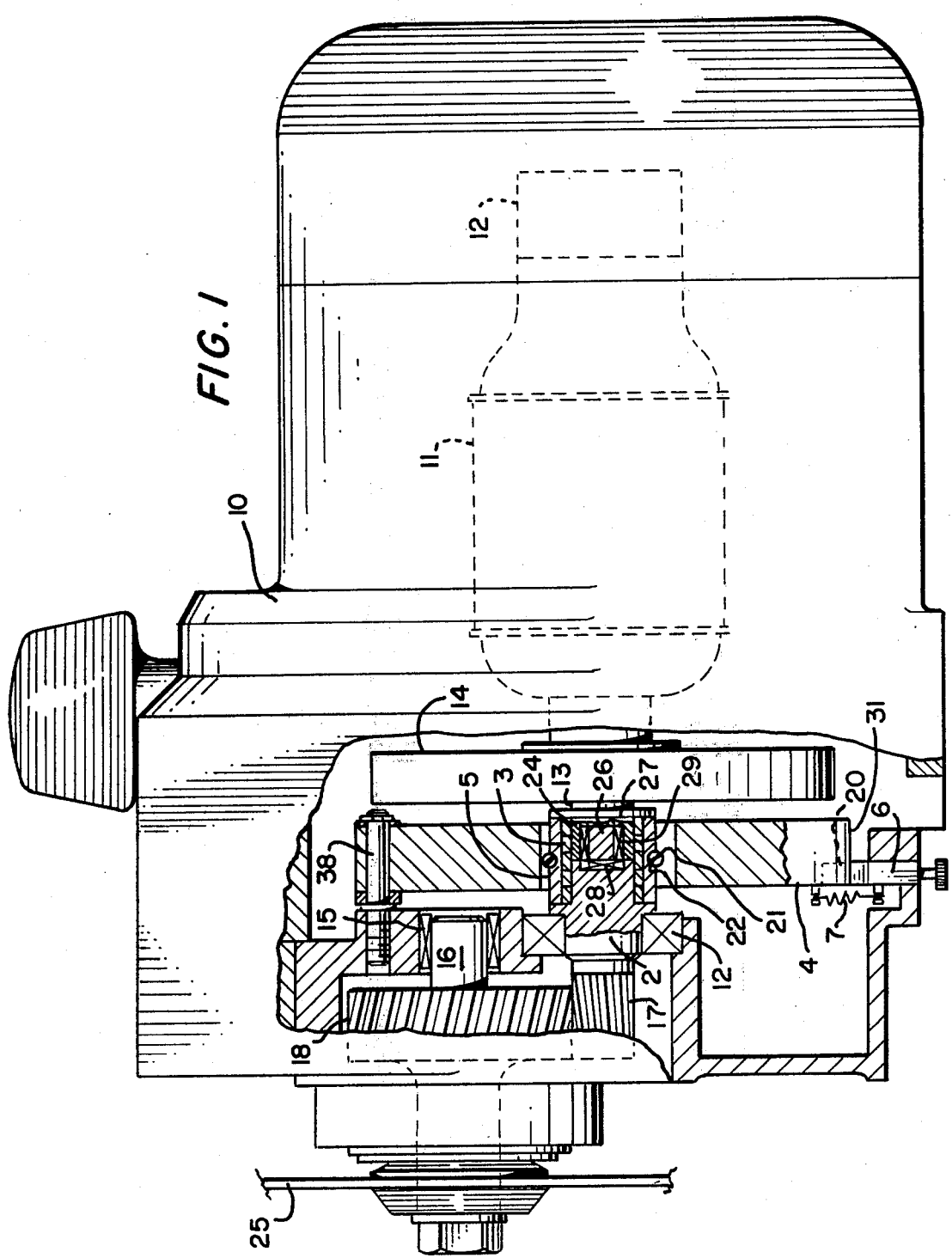
FIG. 1 is a partially sectioned side elevation assembly drawing showing the safety device installed in a motor driven power tool, such as a hand held electric circular saw.

FIG. 1 is an assembly drawing showing the elements of the present invention installed in a typical hand-held electric motor-driven circular saw. The housing of the saw is indicated by reference numeral 10. The housing contains an electric motor 11 supported in the housing by means of appropriate bearings 12 at either end of the motor. Supported on the output spindle 13 is a conventional blade fan 14 for purposes of cooling the motor device.

As shown on FIG. 1, the spindle 13 is terminated at an end 24, which forms a clutch driving element of a wrap spring clutch. A work output means, such as a spindle gear 2, is shown mounted in axial alignment with the spindle and is further mounted for rotation in bearing 12. The spindle gear has a pinion gear 17 formed on one end. The pinion gear 17 engages a second work output gear 18, which is mounted on an arbor spindle 16. The arbor spindle is mounted for rotation in the housing 10 by means of a bearing 15. A work accomplishing device, such as a saw blade 25 in the case of hand-held circular saw is mounted to the arbor spindle in a conventional manner as shown. It should be appreciated that the work accomplishing device may be a related means, such as a drill, chuck, or sander disc. Surrounding the clutch driving element 24 and the clutch driven element or spindle gear 2 is a wrap spring clutch member 3 which connects, and which in its running position transmits torque from the clutch driving element to the spindle gear, and which in its declutched position allows the clutch driver to rotate independently of the spindle gear.

As can be appreciated by one skilled in the art, when the wrap spring is declutched, the power output of the motor is removed from the spindle gear, and, therefore, the gear train and the work accomplishing device. This allows the gear train and the work accomplishing device to rotate freely without applied power.

In order to keep the spindle 13 and the spindle gear in alignment, a stub shaft 26 extends into an internal bore 27 of the spindle. A thrust bearing 28 and a roller bearing 29 retain alignment and allow the spindle gear to rotate relative to the spindle.

Shown on FIG. 1, surrounding the wrap spring is a clutch collar 5. The clutch collar is provided with a wrap spring tang notch 19 (best seen on FIG. 7). The clutch collar serves to retain the wrap spring in alignment and an "O" shaped inertial weight 4 is shown mounted for pivotal rotation on a pivot bolt 38 secured to the saw frame 10. The "O" shaped inertial weight surrounds the clutch collar with operating clearance (as best seen on FIG. 2). A detent 6 is shown operatively engaging the inertial weight and is held in engagement therewith by means of a detent spring 7. As shown on FIG. 2, the inertial weight 4 is provided with a detent notch 20, which is adapted to engage the detent in the declutched position and engage the peripheral surface 31 of the inertial weight 4 in the running position.

Figure 2:
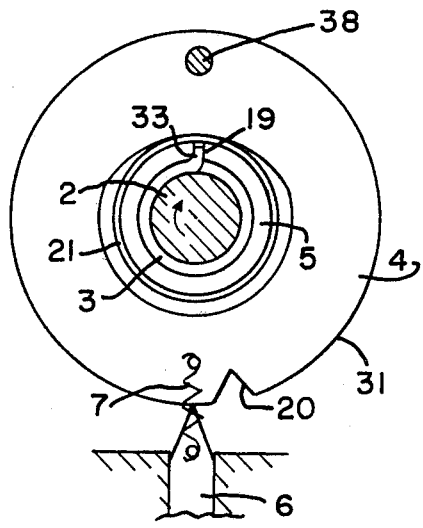
FIG. 2 shows a section taken at 2—2 of FIG. 1 through the safety device showing the running position.
Figure 3:
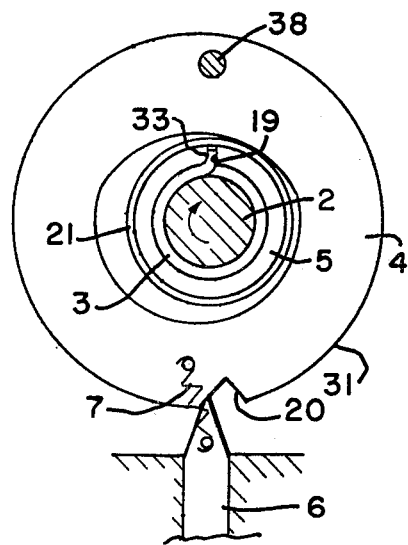
FIG. 3 shows a section taken at 2—2 of FIG. 1 through the safety device showing the declutched position.

FIG. 2 shows a position of the inertial weight relative to the spindle clutch driver and clutch spring in the normal running or power transmitting position of the safety clutch. As can be seen, the clutch collar and spindle are free to rotate without interference by the inertial weight. This position of the inertial weight is held by the action of the spring loaded detent. FIG. 3 shows the relative position of the clutch collar and the inertial weight in the declutched position. The detent 6 is shown engaged in the detent notch 20.

As can be appreciated by one skilled in the art, the clutch collar will rub on the inertial weight when rotated as shown in FIG. 3. The drive rotation of the spindle is shown in the clockwise direction. The rubbing action of the clutch collar on the inertial weight produces a counterclockwise force which is transmitted to the wrap spring clutch through the notch 19 in the clutch collar and the bent tang of the wrap spring. This force and the movement of the tang causes the wrap spring to unwrap and thereby release from the clutch driving element.

The action of the clutch spring is rapid, and a relatively small amount of movement on the clutch collar is required for disengagement. As can be appreciated by one skilled in the art, the clutch will remain declutched until the detent is manually removed from the detent notch, and the inertial weight is allowed to return back to the running position as shown on FIG. 2. The rubbing force may be varied as required by selection of the friction or contact angle between the inertial weight and the clutch collar. In the embodiment shown, an "O" ring 21 is disposed in an "O" ring groove 22 on the clutch collar to increase the coeficient of friction between the weight and collar. The sensitivity to movement may be varied by choice of detent spring or inertial weight.

As can be appreciated, the device as described is particularly sensitive to a rapid movement either to the left or right or counterclockwise as shown in FIG. 2. It is relatively insensitive to movement in the up and down direction. In addition, the detent action will occur only on rapid movement to the right and/or counterclockwise rotation of the housing. The resulting devise, therefore, is ideally suited to declutching where such declutching must be rapid and responsive to an undesired movement, such as a circular saw might experience when the saw blade binds in the kerf or a drill bit binds its hole.

In addition, the device is less susceptible to normal expected movements, such as placing the saw rapidly on the work to be cut and the normal movements during utilization of the power tool.

Figure 4:
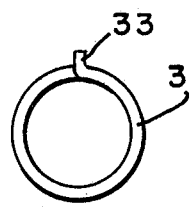
FIG. 4 is an end view of the wrap spring showing an operating tang orientation.
Figure 5:
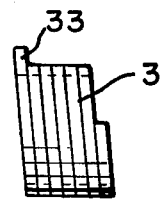
FIG. 5 is a side elevation of the wrap spring.

FIG. 4 and FIG. 5 show the details of the wrap spring clutch which is a coiled form spring. A coil formed spring has a radially extending bent operating tang 33 which is operatively disposed in the operating notch 19 of the clutch collar.

Figure 6:
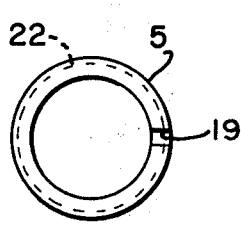
FIG. 6 is an end view of the clutch collar showing the clutch spring tang slots.
Figure 7:
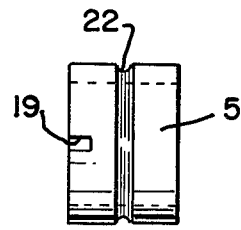
FIG. 7 is a side elevation of the clutch collar.

FIG. 6 shows an end view of the clutch collar showing the operating notch 19. FIG. 7 shows a side elevation of the clutch collar showing the operating notch 19 and the "O" ring groove 22.

It should be appreciated that numerous modifications of the invention as described above are possible; for example, the inertial weight need not be "O" shaped or surround the clutch collar but may be any convenient or designated shape to accommodate the available space or optimize response to a particular movement. In addition, the inertia weight may be supported in any way which will allow its desired degree and/or rate of movement. Further, the interaction between the inertia weight and the clutch collar may be by friction as described or more positive means such as a ratchet pawl on the inertia weight which interacts with saw teeth on the clutch collar. The inertia weight may also be a self-wedging form to eliminate the detent requirement.

Having described the invention and its operation in detail, and suggested numerous variations others will occur to one skilled in the art. I do not wish to be limited in the scope of my invention except as claimed.

I claim:

1. A safety device for power driven tools comprising:
   a motor driven spindle interconnecting a motor means and a work output means;
   a wrap spring clutch interconnecting said spindle with said work output means for transmitting power therebetween; and
   an inertia means operatively associated with said wrap spring clutch for initiating and effecting declutching of said wrap spring clutch in response to a selected movement of the power tool.

2. The safety device of claim 1 wherein:
   said wrap spring clutch comprises a driving member and a driven member interconnected by a releasable spring means.

3. The safety device of claim 1 wherein:
   said wrap spring clutch is provided with a collar means for alignment and operation of said wrap spring clutch.

4. The safety device of claim 1 wherein:
   said inertia means comprises a pivoted weight.

5. The safety device of claim 2 wherein:
   said driving member is the motor spindle.

6. The safety device of claim 2 wherein:
   said driven member forms a part of the output gear train of a power tool.

7. The safety device of claim 2 wherein:
   said releasable spring means is a close wound coil spring with a radially disposed operating tang.

8. The safety device of claim 7 wherein:
   a clutch collar is disposed radially outward of and surrounding said spring means and serves to displace said tang in response to a force resisting rotation of said collar.

9. The safety device of claim 8 wherein:
   an inertia means surrounds said collar and said inertia means operates in response to a selected movement of the power driven tool to resist rotation of said collar.

10. The safety device of claim 9 wherein:
    said inertia means is provided with a detent means for securing said inertia weight in a position to resist rotation of said collar until separately released.

* * * * *